UNITED STATES PATENT OFFICE.

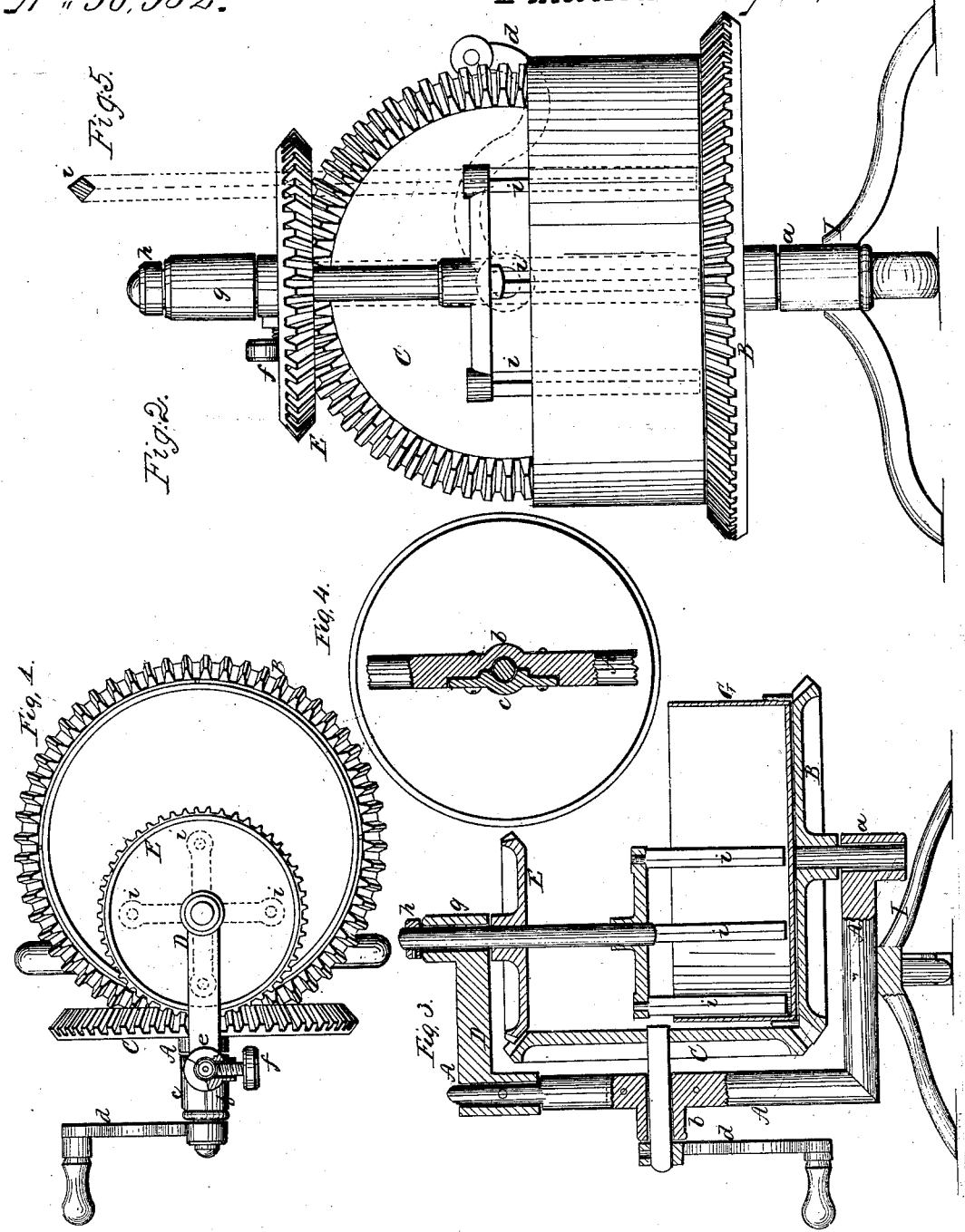

JOSHUA DAVIS, OF SCHENECTADY, NEW YORK.

IMPROVEMENT IN EGG-BEATERS.

Specification forming part of Letters Patent No. 56,382, dated July 17, 1866.

*To all whom it may concern:*

Be it known that I, JOSHUA DAVIS, of the city and county of Schenectady, and State of New York, have invented a new and useful Improvement in Egg and Cake Beaters; and I do hereby declare that the following is a full, clear, and exact description of the same, reference being had to the accompanying drawings, forming part of this specification, in which—

Figure 1 is a plan or top view of my improved machine. Fig. 2 is a front view of the same. Fig. 3 is a vertical section in the line $x\,x$ of Fig. 1. Fig. 4 is a section through the bearing of the crank-shaft. Fig. 5 is a horizontal section of one of the beaters.

Similar letters of reference in the several figures indicate corresponding parts.

The object of my invention is to insure a more perfect separation of the particles of eggs, and also to insure a perfect mixing of the materials used in making cake, as well as effectually to operate upon the eggs and other substances and bring them into the desired condition.

The nature of my invention consists in a revolving pan or vessel, in combination with a revolving beater or stirrer, when the stirrer is arranged to take hold of the eggs or the cake mixture near the inner circumference of the pan or vessel, and the pan by its revolution sets the eggs or other substances in motion, and said substances, by centrifugal force, are thrown to a position which enables the stirrer to thus take hold of them.

It is well known that the heavier particles of matter will under the influence of centrifugal force fly out from the center of motion. This being a fact, it will be seen that my machine is constructed on a plan which will insure the passage of such particles of egg or cake mixture to that point where the beater will effectually operate upon them.

In the operation of the ordinary egg and cake beaters which have the stirrer arranged directly over the center of the pan or vessel, the heavier particles of egg or cake mixture by moving toward the circumference of the pan or vessel get, in a measure, beyond the control of the beater, and therefore the operation of beating and mixing the substances is but imperfectly performed.

To enable others skilled in the art to make and use my machine, I will proceed to describe its construction with reference to the drawings.

A is a cast-metal frame, constructed with the bearing or box $a$, which receives the axis or shaft of a horizontal bevel-wheel, B, and with a box or bearing, $b$, which receives the axis or shaft of a vertical bevel-wheel, C. The bearing $b$ is made with a removable piece, $c$, in order that the shaft of the wheel C may be moved out of place when desirable. The shaft of wheel C carries a hand-crank, $d$. The wheels B and C gear with one another, as shown.

To the upper end of the frame A an angular bracket, D, is attached by means of a tubular portion, $e$, and confined in position by a set-screw, $f$, as shown. The free end of this bracket is made with another tubular portion, $g$, and into the same the shaft or axis of a horizontal bevel-wheel, E, is received and held by a nut or collar, $h$, as shown. The bevel-wheel shaft, F, extends downward some distance and carries on its extremity a cross-shaped casting, into the arms of which stirrer bars or blades $i\,i\,i\,i$ are fastened, as shown.

The bevel-wheel E is of smaller diameter than that C, in order that the stirrer or beater shall revolve with a quicker speed than the base-wheel B.

The three bevel-wheels gear with one another, as shown, and therefore when the crank turns the wheel B revolves in an opposite direction to the wheel E.

G is a deep pan or vessel attached by pins or dowels to the top of the wheel B, so as to be removable at pleasure of the operator, but to revolve with the wheel B during the operation of beating eggs or mixing cake material. The plan shown of confining the pan to its place is three or more pins extending up from the top of the wheel B and fitting into half-cylinder notches formed in the outer circumference of the pan.

To get the pan in place, the bevel-wheel E, together with the stirrer and the bracket, must be lifted out of position, and this is permitted by slackening the set-screw $f$.

The frame is fitted to a support, I, which will retain a firm hold upon a table or other object upon which the machine is placed. Instead of this support a bracket and set-screw may be employed for attaching the machine to a fixed object.

It will be observed from the drawings that each of the beater-bars is formed with four sharp corners, and that three of these corners will at all times be exposed to the substances which are being operated upon.

In practice it may be desirable to have the beater-bars scrape the circumference of the pan, and in that case the beater will be set close enough for that purpose.

My machine, by adding a top to the pan or vessel, so as to inclose the beater, might be employed for churning or beating cream and milk.

The operation is as follows: Place the eggs, cake mixture, or other material in the pan, and then turn the crank until the eggs or other materials are brought to the proper condition. This done, remove the beater and its connections, as before described, and lift the pan out of its seat and empty it of its contents. This done, replace the pan and the beater in their original position.

What I claim as my invention, and desire to secure by Letters Patent, is—

1. An eccentric beater, in combination with a revolving pan or vessel, substantially as and for the purpose set forth.

2. The three bevel-wheels B C E, of differing diameters, one of which is adapted for carrying a pan or vessel, in combination with a revolving eccentrically-arranged stirrer or beater, substantially as described.

Witness my hand in matter of my application for a patent for an improved machine for mixing cake, beating eggs, &c.

JOSHUA DAVIS.

Witnesses:
HENRY SYLVESTER,
EDW. SCHAFER.